INVENTOR
ROBERT M. PAGE

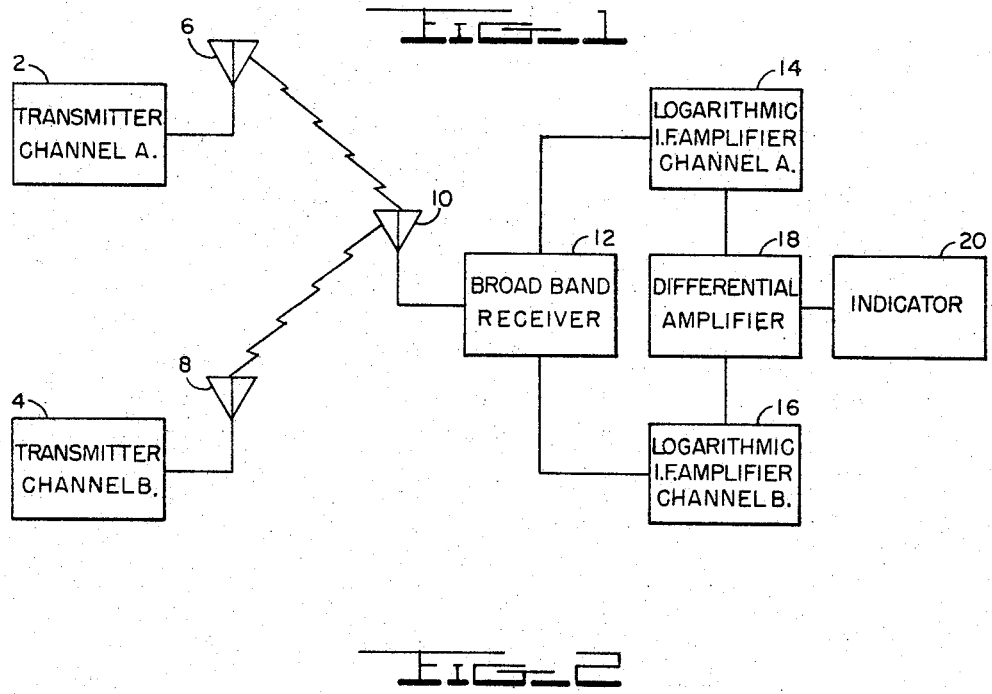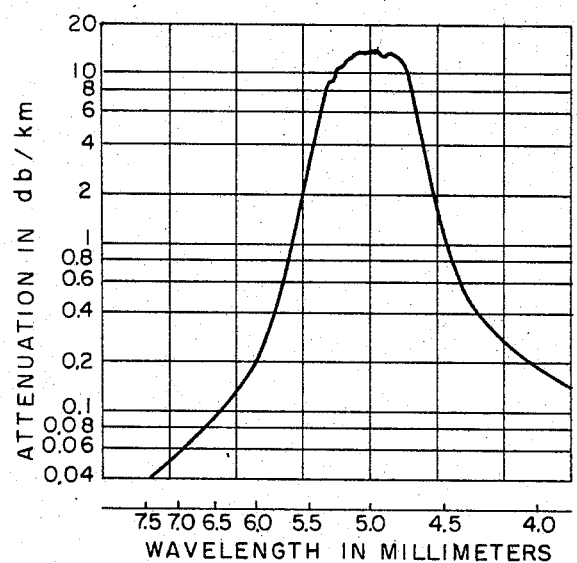

United States Patent Office 3,333,270
Patented July 25, 1967

3,333,270
RADIO NAVIGATION SYSTEM
Robert M. Page, Camp Springs, Md., assignor to the United States of America as represented by the Secretary of the Navy
Filed Oct. 10, 1952, Ser. No. 314,236
10 Claims. (Cl. 343—112)

The invention described herein may be manufactured and used by or for the Government for governmental purposes without the payment of any royalty thereon.

This invention relates to electronic navigational devices and more particularly to a novel radio distance measuring system.

Electronic devices capable of measuring distance between two given locations have been used extensively in recent years, particularly in the case of radar, loran, and IFF. Under certain circumstances it has been necessary to measure the distance between two mobile units and to maintain radio silence on one of the units. In the case of an aircraft carrier operating at sea, it can be seen that it may be absolutely necessary to maintain radio silence and it may be equally essential that the whereabouts of the aircraft based on the carrier, be known at all times. Obviously, radar, loran and IFF would all be unsuitable under these circumstances described above, as radar and IFF systems necessitate the transmission of signals from the point at which information is desired, and loran requires the use of immobile transmitting stations. In addition, these systems possess the disadvantage of being dependent on relatively complicated keying, pulse shaping and time measuring networks, and bulky antennae, all of which detract from utility on crowded vehicles such as aircraft and small ships.

Accordingly, one object of this invention is to provide a radio navigational system for distance measurement between two locations in which transmission of radio signals is required from only one of the locations.

Another object of this invention is to provide a radio navigational system for distance measurement between two mobile craft which maintain radio silence on the craft at which the distance information is desired.

A still further object of this invention is to provide a distance measuring system utilizing relatively simple transmitting and receiving equipment located only at the sites between which measurement is desired.

Yet another object of this invention is to provide a distance measuring system for use between mobile units occupying a minimum amount of room and requiring only relatively unskilled operating personnel.

Still another object of this invention is to provide a distance measuring system utilizing a radiant energy field one characteristic of which changes with distance from the source in such a manner that the distance may be determined at any point in the field by measurements of the characteristics at the point.

Other objects and features of the present invention will become apparent upon consideration of the following detailed description in connection with the accompanying drawings which illustrate various embodiments of the invention. It is to be expressly understood, however, that the drawings are designed for purposes of illustration only and not as a definition of the limits of the invention, reference for the latter purpose being had to the appended claims.

FIGURE 1 is a block schematic diagram of the necessary transmitter and receiving arrangements constituting one form of distance measuring system according to the invention.

FIGURE 2 is a rectangular coordinate graph showing the attenuation of radio signals at frequencies suitable for practicing the present invention.

Figure 3:
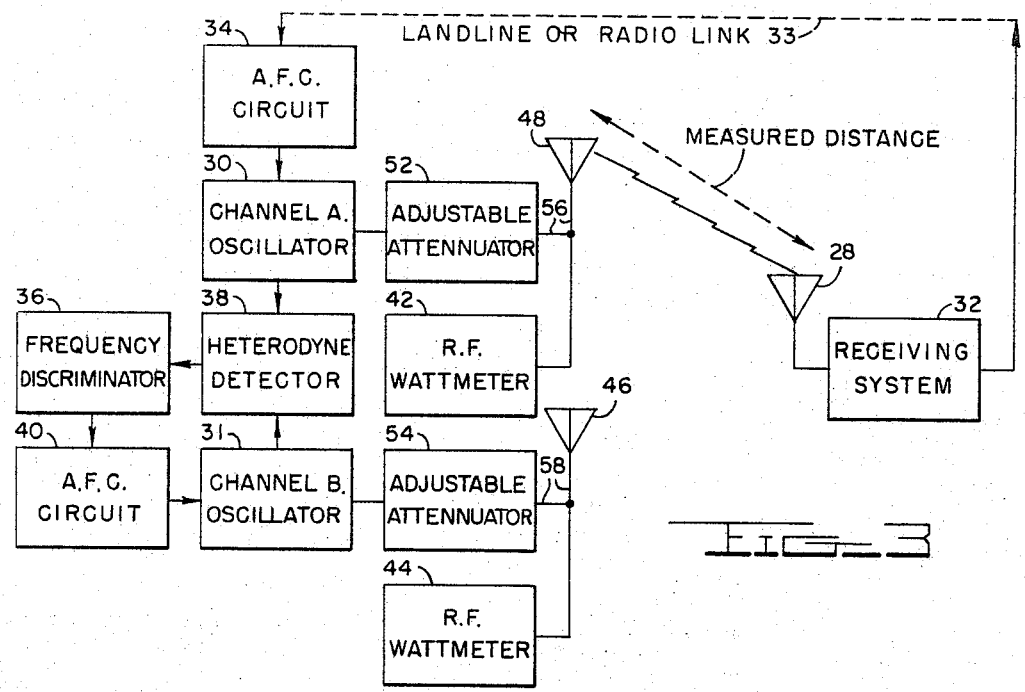
FIGURE 3 shows block schematic diagrams of an embodiment of a suitable transmitter station in which provision is made for frequency control and constant calibration of the distance measuring system.

According to the teachings of this invention, advantage is taken of the fact that radio waves in the microwave region are markedly affected by attenuation produced as a result of absorption of the waves by oxygen and water vapor in the atmosphere. This absorption results from the fact that oxygen has a magnetic interaction at certain frequencies with radiation incident thereto that produces a resonance phenomena at wavelengths in the vicinity of 5 mm. and 2.5 mm. This absorption, at the peak of resonance, is over 15 db per kilometer. The absorption produced by water vapor is due to presence of oxygen in the water vapor molecule; the absorption peak for water vapor alone occurs at wavelengths of about 1.35 centimeters. The maximum attenuation due to the presence of water vapor in the atmosphere varies with the humidity, as would be expected, but is never over 0.5 db per kilometer at wavelengths between 3 and 10 mm. As the water vapor attenuation curve also is very broad in this range, and the oxygen band resonance curve is quite sharp, attenuation due to water vapor may be neglected for the purposes of the following discussion.

According to the present invention two radio transmitters are employed, operating at slightly different frequencies within the band at which attenuation is predominantly brought about by the presence of oxygen in the atmosphere. These transmitters have frequencies which are subject to different rates of oxygen absorption so that when they are placed at the same location, it can be seen that, assuming the transmitters to be radiating equal amounts of power, and the attenuation at a given frequency to be uniform over the paths of transmission, the difference in strengths of the signals received from these transmitters will vary directly as the distance of the receiver from the transmitting location is varied. The difference in the received signal strengths determined at a given location will afford a measure of the distance from the transmitting location.

For a more concrete example of the foregoing, assume that the transmitters are operating on wavelengths of 5.4 mm. and 5.6 mm. Referring now to FIGURE 2, which shows the variation of attenuation of signals at wavelengths in the vicinity of 5 mm., it can be seen that signals radiated by the transmitter operating on 5.4 mm. wavelength will suffer an attenuation of say 7 db per kilometer and that the transmitter operating on 5.6 mm. will radiate signals that will be attenuated by about 2 db per kilometer.

If the radio transmitter operating on 5.4 mm. wavelength has a radiated signal strength of $A_1$ and the transmitter operating on 5.6 mm. has a signal strength of $A_2$, then, since the field strength at a given distance from a source of radiation is given by the formula:

$$E = A(10)^{-.1(a)(R)} \tag{1}$$

where "a" is the attenuation constant of wavelength "W" in db per kilometer and "R" is range in kilometers, it then follows that at wavelengths W1 and W2, $$\frac{E_1}{E_2} = \frac{A_1}{A_2} 10^{-.1(a_1 - a_2)R} \tag{2}$$

$$R = 10/(a_2 - a_1) \log_{10} \frac{A_2 E_1}{E_2 A_1} = K \log \frac{E_1}{E_2} \tag{3}$$

K is a constant at given frequencies of operation dependent on the radiated power ratio and the difference between the attenuation coefficients.

From the above discussion it can be seen that $$\frac{E_1}{E_2} = \frac{A_1}{A_2}(10)^{.5R} \quad (4)$$

and that $$R = 2 \log \frac{E_1 A_2}{E_2 A_1} \quad (5)$$

when the attenuation coefficients for the wavelengths 5.4 mm. and 5.6 mm. are substituted in the above equations.

Referring now to FIGURE 1, there is shown one embodiment of the present invention. In this embodiment the differently tuned radio transmitters 2 and 4 are coupled to separate substantially identical antennae 6 and 8, respectively, which in turn, preferably have radiation patterns as nearly identical as possible. If the antennae are less than a few wavelengths above ground, water, or other reflecting surface, it may be necessary to position each antenna the same number of wavelengths above the reflecting surface. It is also preferable to have the horizontal radiation patterns identical to avoid calibration problems. When the radio transmitters and antennae are mounted in an aircraft, the vertical radiation patterns may be made identical for all practical purposes without consideration as to antenna height.

At the remotely located receiving station there is included a microwave receiver 12, preferably a superheterodyne, coupled to a suitable omnidirectional antenna 10. The essential characteristic of the receiver 12 is that the ratio of the signal strengths at the input thereof be faithfully maintained at the output. If a single detecting means is used, the band width of the receiving means 12 must be such that the signals received from both transmitters 2 and 4 receive attenuation or amplification in the same ratio; in other words, the two signals must be given like treatment in the detection and amplification stages of the receiver 12. The channel A signal received from transmitter 2 is applied to logarithmic I.F. amplifier 14, and the channel B signal from transmitter 4 is applied to logarithmic I.F. amplifier 16. These logarithmic amplifiers may be of conventional design; for example, design techniques such as described in an article in the Journal of the Institution of Electrical Engineers, volume 95, part III, page 459, may be used. The respective amplifiers must have a sufficiently narrow bandwidth so that only the corresponding received signal will be amplified by each amplifier; i.e., amplifier 14 must amplify only the channel A signal and amplifier 16 must amplify only the channel B signal. The amplitude of the output of this amplifier must be logarithmically related to the amplitude of the signal at the input terminals thereof so that the amplitude of the input signals to the logarithmic amplifier will be related to each other by the equation:

$$\frac{E_1}{E_2} = \frac{A_1 10^{-.1 a_1 R}}{A_2 10^{-.1 a_2 R}} \quad (6)$$

In order to provide a single voltage that will express this ratio, it is only necessary to take the difference output voltage of amplifiers 14 and 16. In the present embodiment this is obtained by means of an ordinary differential amplifier 18 and the output is indicated by means of a suitable voltage indicator device calibrated in terms of distance represented as indicator 20. The output voltage of the differential amplifier as indicated by device 20 will then be given by the equation:

$$V = \log E_1 - \log E_2 = \log \frac{E_1}{E_2} \quad (7)$$

which is essentially the expression for the distance between transmitting and receiving locations given by Equation 5. Compensation can be made for the constant "2" in Equation 5 by suitably calibrating indicating device 20.

It will be recognized that precise operation of the system described above requires that there be a constant difference in the attenuation coefficients of the frequencies on which the transmitters operate. It is not necessary that the transmitters always operate on the *same* frequency; but only that the difference in the attenuation coefficients of the frequencies on which they do operate be maintained constant. For example, suppose that there must be a 5 db/kilometer difference in the signals received by the receiving system for the receiver to produce a correct indication of range between transmitter and receiver. Referring to FIGURE 2, it can be seen that a wavelength of 5.6 mm. and 5.4 mm. will give this difference. If the operating frequency of one transmitter shifts to a lesser wavelength, the required difference in attenuation may be maintained by operating the other transmitter on a smaller wavelength. As illustrated in FIGURE 2, if the transmitter operating on the higher frequency is kept between 5.5 and 5.2 mm. and the frequencies of the transmitters are maintained apart by a constant frequency difference, the difference in the attenuation of the signals of the transmitters will be substantially constant.

A circuit arrangement for controlling frequency of operation in the manner above described is shown in FIGURE 3 and includes a first oscillator 30 operable at one of the frequencies to be transmitted and a second oscillator 31 operable at the other frequency to be transmitted. The outputs of these oscillators are coupled to respective antennae elements 48 and 46 similar to elements 6 and 8, through adjustable attenuators 52 and 54 later to be described. Also included is a monitor receiver 32, of the type shown in FIGURE 1, the antenna 28 for which is fixed and located at a known distance from the transmitting station. The signal from the output of this receiver is relayed back to the transmitting location to actuate automatic frequency control unit 34 which is coupled to and controls the frequency of operation of oscillator 30. Either a landline or a radio link 33 may be used for this purpose.

Part of the outputs of channel A oscillator 30, and of channel B oscillator 31 are fed into a heterodyne detector 38 which delivers the heterodyne beat frequency of the two oscillators. The beat frequency output of detector 38 is then fed to a frequency discriminator circuit 36, the amplitude of the output of which is a linear function of the frequency shift of the signal applied thereto. This output voltage is used to control the operating frequency of channel B oscillator 31 through automatic frequency control circuit 40. If oscillators 30 and 31 are klystrons, AFC circuits 34 and 40 may control the reflector voltage of the klystrons and thus control the operating frequencies. In the event that an insufficient amount of control is obtained by variation of the reflector voltage, or if a magnetron oscillator is to be used, resort may be had to physical control of the resonant cavities through a servomechanism. Reference is made to the M.I.T. Radiation Laboratory Series, volume 3, page 270, for a discussion of systems utilizing this method of automatic frequency control.

Transmitter oscillators 30 and 31 are maintained a given number of kilomegacycles apart as a result of the action of detector 38, frequency discriminator 36 and AFC circuit 40. To this extent they are "locked" in frequency; a change in frequency of transmitter 30 must result in a change in frequency of transmitter 31. The output signal of detector 38 is at a frequency equal to the difference in the operating frequencies of the transmitters. When the frequency of either transmitter changes, an error signal will appear at the output of frequency discriminator 36. This error signal varies the frequency of transmitter 31 through AFC circuit 40 so as to restore the required frequency relation with transmitter 30.

Since receiving antenna 28 is at a fixed, known distance from the transmitter location, the output signal from receiver 32 will have a constant value as long as transmitters 30 and 31 operate on frequencies having a given difference in attenuation coefficients. However, when the transmitters shift to frequencies such that the difference in attenuation coefficients is no longer of the given value, the output signal of receiver 32 will vary AFC circuit 34, which will then act to change the frequency of transmitter 30 in a direction that will restore the output of receiver 32 to its original value. Thus, heterodyne detector 38, frequency discriminator 36 and automatic frequency control circuit 40 operate to maintain a fixed difference in the operating frequencies of oscillators 30 and 31, while receiver 32 and automatic frequency control circuit 34 operate to maintain the two oscillators at a substantially fixed point on the resonance curve of FIGURE 2.

Figure 4:
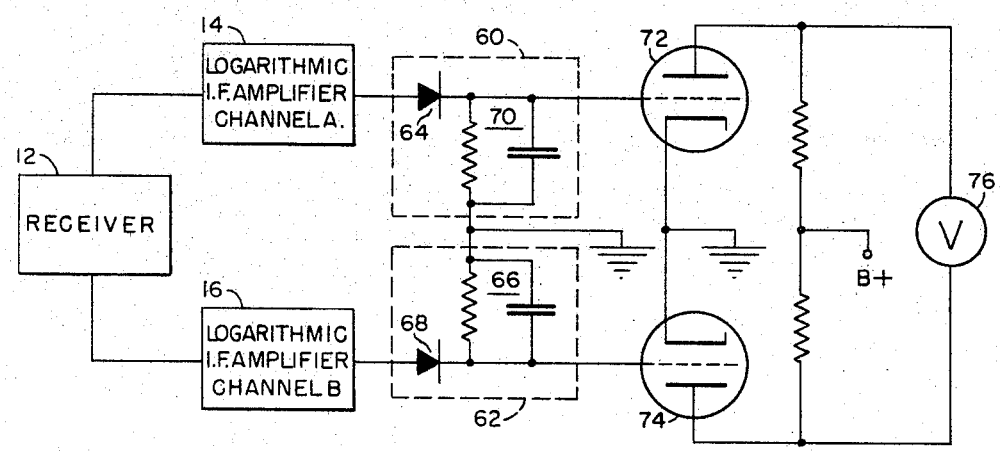
FIGURE 4 is a schematic diagram showing in greater detail certain features of the receiving system of FIGURE 1.

In FIGURE 4, certain features of the receiving system displayed in FIGURE 1 are shown in greater detail. As can be seen, logarithmic amplifiers 14 and 16 are connected to a differential amplifier comprising detectors 60 and 62 and vacuum tube amplifiers 72 and 74. Detectors 60 and 62 are made up of unilateral conducting elements 64 and 68, and filter units 66 and 70. The output signals from these detectors drive the grids of the push-pull plate connected vacuum tube amplifiers 72 and 74. A distance calibrated voltage measuring device 76 is connected between the plates of the vacuum tubes. The unilateral conducting elements 64 and 68 are connected in such a manner that, when the output signals from logarithmic amplifiers 14 and 16 are applied to detectors 60 and 62, the amplified signal appearing between the plates of amplifiers 72 and 74 will be indicative of the differences in amplitude of the output signals of the logarithmic amplifiers.

It is not necessary that the power delivered to the transmitting antennae 46 and 48 be equal, so long as this power erelation is such that the difference in the received signals increases with increasing distance from the transmitting antennae. However, it will be recognized that it is necessary for correct operation of this system that the power delivered to the antennae 46 and 48 by transmitters 30 and 31 be kept at least in a known ratio. As shown in FIGURE 3, RF wattmeters 42 and 44 are connected to transmission lines 56 and 58 respectively, to measure the power delivered to antennae 46 and 48. Adjustment of the power output from transmitters 30 and 31 to the respective transmission line resonated therewith may be made by varying the attenuation between the individual transmitter and antenna, as by adjustable attenuators 52 and 54. A power measuring arrangement utilizing an attenuator, a thermistor and an indicating device, such as shown in A. V. Haeff Patent No. 2,589,248 may be used for wattmeters 42 and 44. The power delivered to the antenna may be varied by insertion of a variable attenuator in the transmitter line. A suitable attenuator may be a device such as found at page 716, M.I.T. Radiation Laboratory Series, vol. XI, modified for use at frequencies in the oxygen band.

Although the embodiments disclosed in the preceding specification are preferred, other modifications will be apparent to those skilled in the art which do not depart from the scope of the broadest aspects of the present invention.

What is claimed is:

1. In a navigation system a signal energy transmission medium, first and second means for generating signals on first and second frequencies having different, relatively constant transmission attenuation coefficients in the transmission medium, first and second antenna means coupled to said signal generating means and to the transmission medium having essentially the same radiation patterns, a remote receiving means for receiving said signals, and means correlating the distance of said receiving means from said first and second signal generating means in terms of the relative amplitudes of the received signals.

2. In a navigation system, first and second transmitter means operative to transmit signals on first and second frequencies having different, known transmission attenuation coefficients, receiving means located a known distance from said transmitter and responsive to the difference in signal strengths of the signals from said transmitter means, means operative to produce an output signal one characteristic of which is indicative of the distance from said transmitter means to said receiver means, means responsive to the output signal of said receiver means controlling the operating frequency of said first transmitting means to maintain constant said characteristic of the amplitude output signal of said receiving means, and means responsive to the difference in frequencies of said first and second transmitter means operative to maintain constant the frequency separation of said first and second transmitter means.

3. In a navigation system, means operative to transmit signals of given power ratio on two frequencies having known, different transmission attenuation coefficients according to substantially uniform vertical and horizontal radiation patterns, means receiving said signals at a location remote from said first means, amplifying means individually amplifying the received signals, the amplitude of the output signals of said amplifying means being logarithmically related to the amplitude of the input signals thereof, differential amplifying means combining the output signals of said amplifying means so as to obtain a signal related to the difference of said output signals, and indicator means for indicating the output of said differential amplifying means.

4. A navigation system comprising transmitter means operative to transmit signals on first and second frequencies having different transmission attenuation coefficients, means at a known distance from said transmitter means operative to adjust the frequencies of said transmitter means so as to maintain a given difference in the signal strengths of the signals received by said means on said first and second frequencies, and means operative to maintain constant the separation of the operating frequencies of said transmitter means.

5. A navigation system comprising first and second transmitter means operative to transmit signals of given intensity on first and second frequencies having different, known transmission attenuation coefficients, means located a known distance from said transmitting means and responsive to the difference in signal strengths of the signals from said transmitter, receiving means operative to produce an output signal one characteristic of which is indicative of the distance from said transmitter means to said receiver means, means responsive to said characteristic of said receiver means operative to maintain said characteristic at the value indicative of the separation of said transmitting and receiving means by controlling the frequency of said first transmitting means, detector means responsive to the output signals of said first and second transmitter means operative to produce a signal the frequency of which is equal to the difference of frequencies of said first and second transmitting means, means responsive to said detector means operative to produce a reference signal the amplitude of which is a function of the difference in the frequency of the output of said detector means from a given frequency, and means responsive to said reference signal operative to control the frequency of said second transmitter means.

6. A navigation system comprising first and second transmitter means operative to transmit signals of given intensity on first and second frequencies having different transmission attenuation coefficients, antenna means located a known distance from said transmitter means receiving said signals and applying said signals separately to logarithmic amplifiers, first and second logarithmic amplifiers coupled to said antenna means separately responsive to signals resulting from reception of transmitted signals at the first and second frequencies, the output of said amplifiers being logarithmically related to the signals applied to the input thereof, mixing means at the output of said amplifiers for deriving a signal related to the difference of the output signals of said logarithmic amplifiers, means controlling the frequency of said first transmitter means operative to maintain constant the output of said mixing means, detector means operative to derive a signal the frequency of which is equal to the difference of the frequencies of said first and second transmitter means, and means controlling the frequency of said second transmitter means operative to maintain constant the frequency of said detector means.

7. In a radio frequency operative navigation system, means for transmitting a first signal at a frequency within the oxygen and water vapor resonance region of the atmosphere, means disposed at substantially the same locality as the first named means for transmitting a second signal at a frequency having different relative absorption characteristics and relatively constant transmission characteristics, and a remote receiving means for receiving and comparing the relative intensities of the received signals.

8. In a radio frequency operative navigation system, means for transmitting a first signal at a frequency having approximately 5-millimeter wavelength, means disposed at substantially the same locality as the first named means for transmitting a second signal at a wavelength having a different and relatively constant transmission attenuation coefficient, and a remote receiving means for receiving and comparing the relative intensities of the received signals.

9. In a navigation system employing radio frequency signal energy, means for transmitting first and second radio frequency signals at two frequencies of approximately 5-millimeter wavelength having different transmission attenuation coefficients, and a remote receiving means for receiving and comparing the relative intensities of the received signals.

10. In a process for measuring the distance between two objects displaced by a selective frequency absorbing atmosphere, the steps of actively producing a pair of closely related different fixed frequency microwave electromagnetic radiations at one of the objects, with the frequency of one of said radiations being at the frequency of an atmospheric absorption line and being attenuated at a known rate in passing through the atmosphere and the other being at a closely related different microwave frequency being outside of any of the atmospheric absorption lines, and receiving both radiations at the second object and comparing the relative attenuations of the two radiations to determine the distance between the objects.

References Cited
UNITED STATES PATENTS

| | | | |
|---|---|---|---|
| 1,828,531 | 10/1931 | Gage | 343—112 |
| 1,961,757 | 6/1934 | Gage | 343—112 |
| 3,056,958 | 10/1962 | Anderson | 343—112 |
| 3,098,225 | 7/1963 | Anderson | 343—12 |

OTHER REFERENCES

Reprint from R.C.A. Review, March 1948, vol. IX, No. 1, "Simultaneous Field Strength Recordings on 47.1, 106.5 and 700 Megacycles," by W. L. Carlson.

RODNEY D. BENNETT, *Primary Examiner.*

NORMAN H. EVANS, CHESTER L. JUSTUS,
*Examiners.*

R. E. BERGER, *Assistant Examiner.*